(12) United States Patent
Pollock et al.

(10) Patent No.: US 6,336,533 B1
(45) Date of Patent: Jan. 8, 2002

(54) NOISE DAMPENING BRAKE SHOE

(75) Inventors: Paul Pollock, Mattawan; Richard Joslin, Plainwell, both of MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/589,874

(22) Filed: Jun. 9, 2000

(51) Int. Cl.7 .............................................. F16D 69/00
(52) U.S. Cl. ............................. 188/250 B; 188/250 E; 188/250 G
(58) Field of Search ....................... 188/250 A–250 H, 188/250 R, 234–248, 258, 73.1; 72/379.2; 192/107 R, 107 T; 228/136

(56) References Cited

U.S. PATENT DOCUMENTS

| 1,866,252 A | 7/1932 | Dodge |
| 2,146,208 A | 2/1939 | Farkas |
| 2,348,499 A | 5/1944 | Sawtelle |
| 2,571,431 A | 10/1951 | Farkas |
| 2,571,432 A | 10/1951 | Farkas |
| 2,658,473 A | 11/1953 | Hunt |
| 2,687,627 A | 8/1954 | Binder |
| 2,750,006 A | 6/1956 | Super |
| 4,773,512 A | 9/1988 | Murakami |
| 4,987,979 A | 1/1991 | Wicks |
| 5,261,512 A | * 11/1993 | Young ................... 188/250 B |
| 5,407,036 A | 4/1995 | Hummel et al. |
| 5,515,952 A | 5/1996 | Jackson |
| 5,836,428 A | * 11/1998 | Young ................... 188/250 G |
| 5,887,686 A | 3/1999 | Tanaka et al. ........................ |

* cited by examiner

Primary Examiner—Christopher P. Schwartz
Assistant Examiner—C. T. Bartz
(74) Attorney, Agent, or Firm—Liniak, Berenato, Longacre & White

(57) ABSTRACT

A brake shoe having a noise dampener made of a yielding member secured to the web plate. The yielding member is provided to dampen or counter stick/slip frequencies resulting from the interaction between the brake drum surface and the brake lining during a braking event. Preferably the brake shoe includes two spaced-apart web plates and the yielding member is a coiled spring disposed there between.

16 Claims, 3 Drawing Sheets

NOISE DAMPENING BRAKE SHOE

FIELD OF THE INVENTION

The present invention relates to a drum brake shoe and more particularly to a drum brake shoe having a noise dampener.

DESCRIPTION OF THE PRIOR ART

The application of brakes to slow or stop a vehicle causes significant amount of noise to emanate from the vehicle. Such noise originates from the interface between the brake drum and a friction material during braking. Resonance develops at the friction material brake drum/rotor interface which may be transmitted through the brake shoe assembly, the mounting hardware and suspension system thereby causing objectionable noise to emanate from the vehicle.

The prior art has recognized the problem of noise generated during braking. Therefore, significant effort has been made to reducing objectionable noise generated in a drum brake assembly. For example, as shown in FIG. 1, a mass dampener 1 is positioned directly on the inner periphery of the arcuate brake show 2. Further efforts, as depicted in FIG. 2, have been directed to providing a plurality of reinforcements 3 arranged at irregular intervals on each side of the web plate 4 thereby increasing the torsional rigidity to inhibit resonant vibrations.

Unfortunately the prior art fails to provide an adequate and definite solution to the noise problem. Large vehicles such as trucks and busses are particularly susceptible to the generation of noise during the braking process and the aforementioned attempts to reduce the resonance and noise emanating from the brake drum friction material interface have been least successful in these applications.

When the lining contacts the drum, the lining does not smoothly apply itself to the drum surface. During braking there is a stick slip motion that has a definite frequency for every lining formula, drum material and operating temperature. Every lining has temperature windows that produce noise. Every system (suspension, springs, axles, drum, tires, rims, etc.) has a frequency that produces noise. Because noise and wear dynamically relate to one another, designers have difficulty finding a compromise to reduce noise for a given application. Therefore, it is desirable to dampen or counter act the frequency of the stick slip of the lining to the drum at the source. Such dampening would allow brake designers to concentrate on longer wearing linings with less consideration given to noise.

SUMMARY OF THE INVENTION

It is an object of the invention to provide an improved brake shoe that reduces noise by damping or countering the frequency of the stick/slip between the brake shoe and drum surface and overcomes the drawbacks of and improves upon the related art.

The present invention is directed to brake shoe having a noise dampener made of a yielding member secured to the web plate. The yielding member is provided to dampen or counter stick/slip frequencies resulting from the interaction between the brake drum surface and the brake lining during a braking event. Preferably the brake shoe includes two spaced-apart web plates and the yielding member is a coiled spring disposed there between.

DETAILED DESCRIPTION OF THE PREFERRED EMBODIMENT

Figure 1:
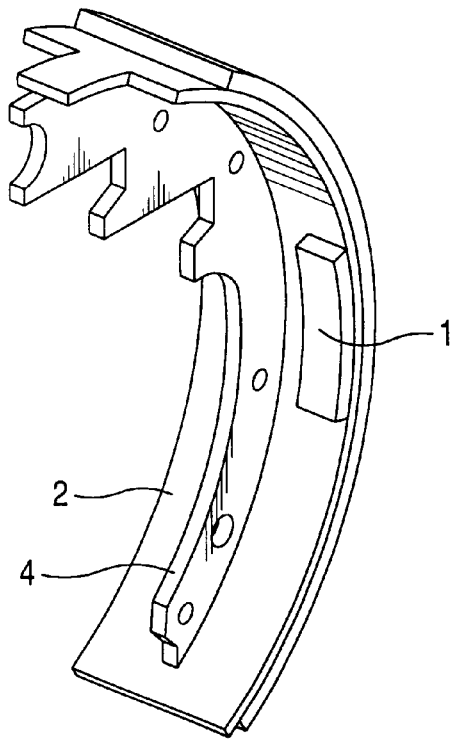
FIG. 1 is a perspective view of a brake shoe of the prior art.
Figure 2:
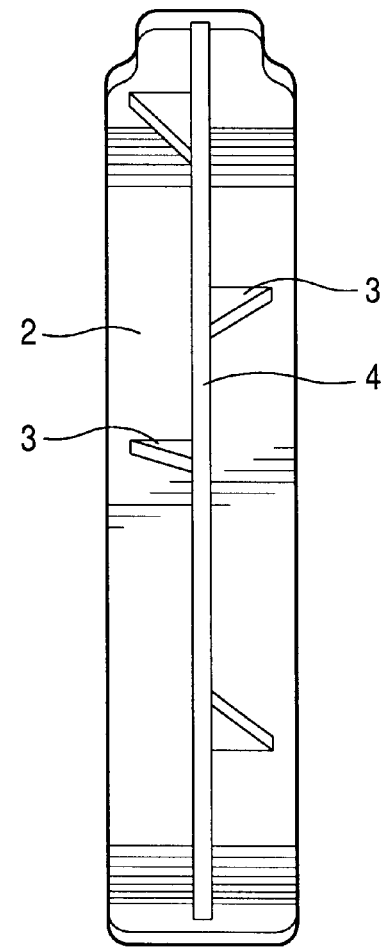
FIG. 2 is a bottom view of a brake shoe of the prior art.
Figure 3:
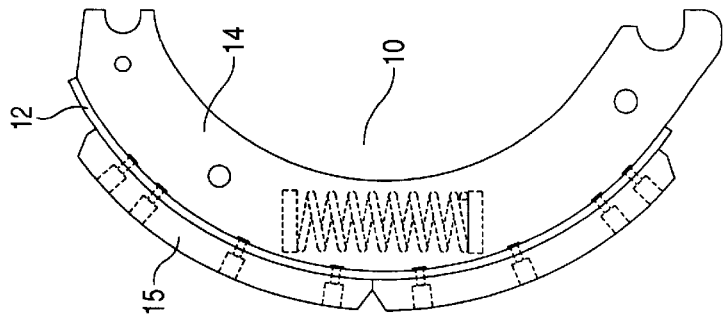
FIG. 3 is a side view of the brake shoe according to the present invention.

Referring to FIG. 2 the brake shoe 10 of the present invention has an arcuate member 12. A brake lining 15 is attached to the arcuate member 12 by rivets embedded in the brake lining 15 as is conventional in the art. Referring to FIG. 3, a pair of spaced-apart web plates 14 are secured to the arcuate member 12 in a conventional manner and serve to structurally reinforce the arcuate member and provide a means to connect and cooperate with a brake actuating assembly (not shown). As can be seem in FIG. 3 a pair of tabs 17 are formed on the inside surface of each web plate 14 to define a chamber area 18. A dampener made 16 of a yielding member is disposed in the chamber area 18 and secured to either the tabs 17 or directly to the web plates 14. Preferably, a coiled spring 16 is employed as the yielding member. The coiled spring 116 may be at least slightly compressed and forced between the tabs 17 and frictionally retained there between. However, it is preferred to additionally positively secure the coiled spring 16 to the tabs 17 such as by welding, adhering or other conventional securing means. When the brake shoe 10 of the present invention is employed and the brake lining 15 engages the friction surface of a brake drum assembly, the brake lining 15 does not often smoothly apply itself to the brake drum friction surface. As a result, there is a stick/slip motion, which has a definite frequency and produces objectionable noise. If an ordinary simple rigid mass were used, such would not adequately dampen the stick/slip vibrations to reduce noise. The yielding member is defined as a member that lacks rigidity or stiffness. Preferably a coiled spring is used as a dampener/yielding member. Application of the brakes and occurrence of stick/slip frequencies has a dynamic effect on the yielding member and thus has a dampening effect on the stick/slip vibration frequencies generated during braking. Consequently, objectionable noise is reduced. This arrangement has been show to provide superior noise dampening characteristics over the simple rigid mass dampeners 1 applied to the arcuate member 2 of the brakes shoe of the prior art such as that shown in FIG. 1.

Figure 4:
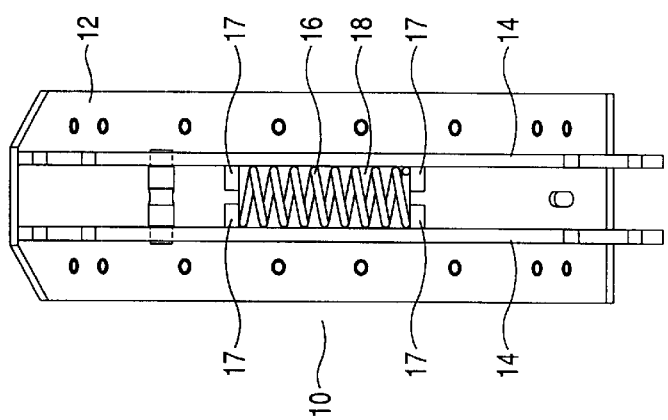
FIG. 4 is a bottom view of the brake shoe according to FIG. 3.

FIG. 4 represents an alternate preferred embodiment of the present invention. Much like the embodiment of FIGS. 2–3 the brake shoe 110 has a brake lining 115 mounted to an arcuate member 112 such as by rivets or other conventional securing means. A pair of spaced apart web plates 114 are secured to the arcuate member 112 in a conventional member and serve to structurally reinforce the arcuate member 112 and provide a means to connect and cooperate with a brake actuating assembly (not shown). A pair of corresponding aligned bores 119 are formed in each of the web plates 112. A pair of pins 120, one each are disposed in each of the aligned bores 119 of each web plate 114 and span the distance between the web plates 114. A coiled spring is connected to the pins 120 and is preferably under some tension. The pins 120 are curved or bent inward toward one another. Such an arrangement provides a simple means to secure the spring 116 and pins 120 to the web plates 114. The pins 120 are simply inserted in corresponding aligned bores 119 and each end of the spring has a hook or other securing device to attach the spring 116 to the pins 120. Because the spring 116 is under tension, and the pins 120 are bent or curved, the pins are prevented from dislodging from the aligned bores 119 and thus the entire dampener assembly is positively secured to the web plates 114.

As in the embodiment of FIGS. 2–3, when the brake shoe 110 of the present invention is employed and the brake lining 115 engages the friction surface of a brake drum assembly, the brake lining 115 does not often smoothly apply itself to the brake drum friction surface. As a result, there is a stick/slip motion, which has a definite frequency and produces objectionable noise. The coiled spring 116 is used as a dampener/yielding member. Application of the brakes and occurrence of stick/slip frequencies has a dynamic effect on the coiled spring 116 and a dampening effect on the stick/slip vibration frequencies generated during braking. Consequently, objectionable noise is reduced.

Figure 5:
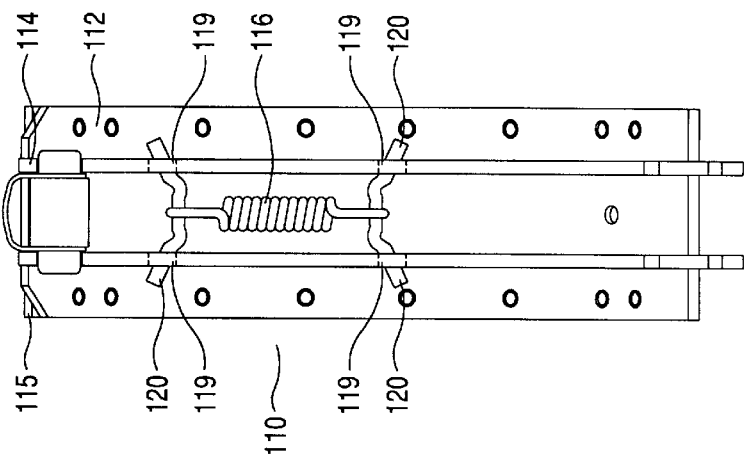
FIG. 5 is a bottom view of the brake shoe according to an alternate embodiment.
Figure 6:
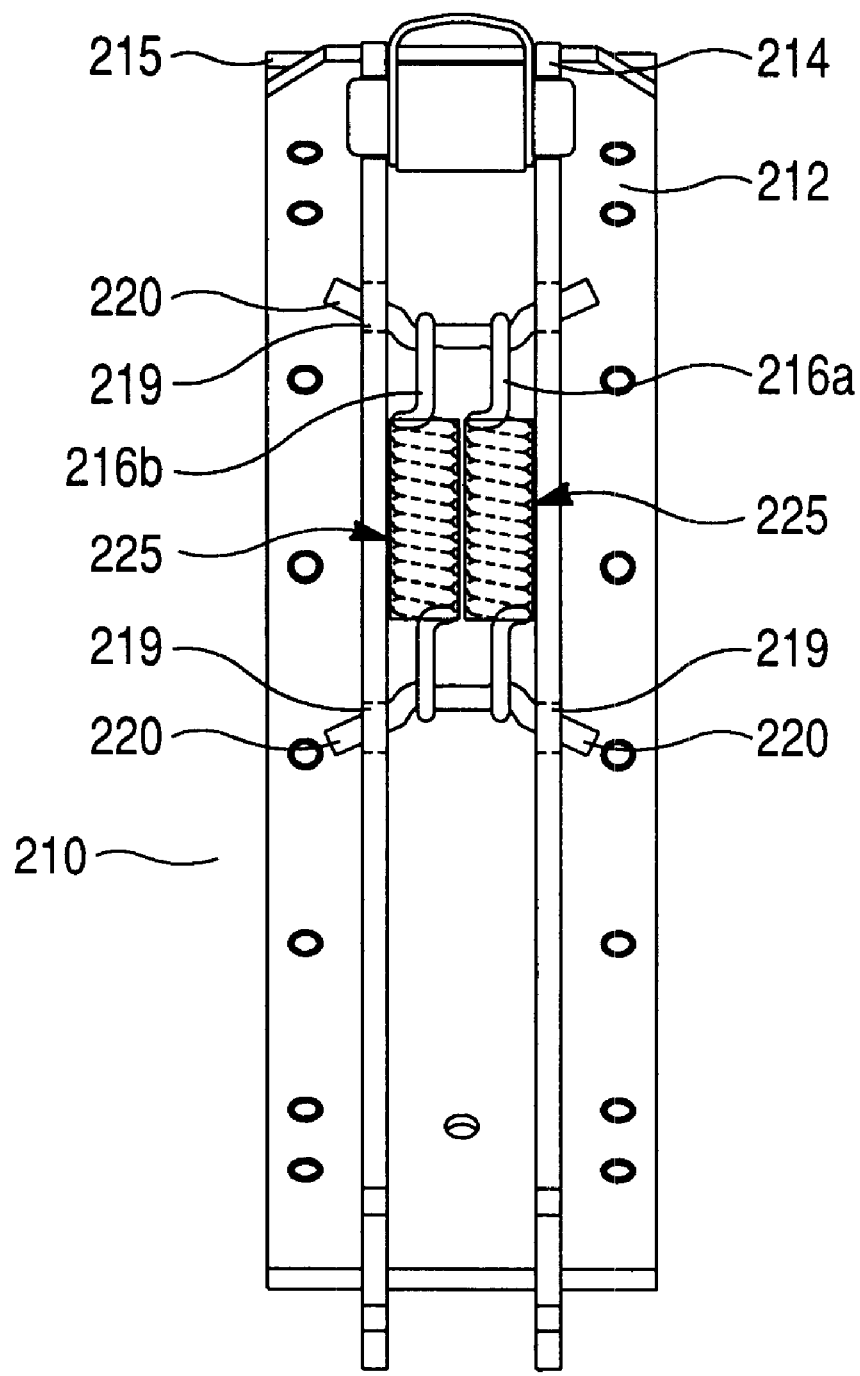
FIG. 6 is a bottom view of the brake shoe according to another alternate embodiment.

FIG. 6 is depicts an alternate preferred embodiment of the present invention. Much like the embodiment of FIG. 5, the brake shoe 210 has a brake lining 215 mounted to an arcuate member 212. A pair of spaced apart web plates 214 are secured to the arcuate member 212 similar to the embodiment depicted in FIG. 5. A pair of aligned bores 219 with a pair of pins 220 extending there between are provided spanning the distance between the web plates in the same fashion as describe in the embodiment of FIG. 5. Rather than a single coiled spring, a pair of coiled springs 216a, 216b are arranged side by side and connected to the pins 220 under tension. Each of the coiled springs are substantially covered by a cylindrical sleeve 225 of sheet metal which is crimped about the spring. The sheet metal sleeves 225 may also be dimensioned to engage the web plates 214. The cylindrical sleeves 225 serve to provide a surface for the springs to contact and rub against during vibration and therefore enhance vibration absorption. The sheet metal sleeves 225 are first crimped onto each spring and the springs 216(a,b) are then disposed between the web plates 214 and placed under tension to engage the pins 120. During braking, as the springs vibrate, the springs 216 rub against the sleeves 225 and the sleeves 225 may rub against the web plates 214 enhancing vibration absorption. The resultant combination has been shown to substantially reduce brake noise during braking.

While the foregoing invention has been shown and described with reference to a preferred embodiment, it will be understood by those possessing skill in the art that various changes and modifications may be made without departing from the spirit and scope of the invention. For example, while the dampener/yielding member has been preferably described as a coiled spring, other yielding materials could be used as a dampener such as a fluid or a piezoelectric material.

A container having a fluid contained therein may be employed as a dampener and simply secured to the web plates 14/114 or tabs 17. In such an arrangement, some void must exists in the container, meaning that the container is not completely full. When stick/slip vibrations occur, the fluid is agitated thereby changing the inertia characteristics and the natural frequency of the brake shoe 10. The result is a dampening of resonant vibrations and objectionable noise.

Similarly, a piezoelectric material may be secured to either of the web plates 14/114 or the tabs 17. As the brake shoe and web plate endure stick slip vibration frequencies, the inertia characteristics of the piezoelectric material changes thereby changing the natural frequency of the brake shoe assembly 10/110 to thereby dampen resonant vibrations. Thus objectionable noise of is reduced. It is noted that a coiled spring remains the preferred embodiment and no claims/admissions are made to the quantitative differences in dampening ability between the coiled spring and the aforementioned fluid and piezoelectric material embodiments. The use of a coiled spring in the aforementioned embodiments has been shown to significantly dampen noise in a brake shoe assembly during a braking event and as such remains the preferred embodiment of the claimed invention.

What is claimed is:

1. A brake shoe comprising:

an arcuate member having an inner and outer surface;

a lining secured to said outer surface of said arcuate member and being provided to engage a brake drum in a braking event;

at least one web plate secured to said inner surface of said arcuate member; and a yielding member secured solely to said brake shoe, said yielding member being provided to dampen stick slip frequencies of said brake shoe during said brake event thereby reducing objectionable noise.

2. The brake shoe according to claim 1, wherein said yielding member comprises a coiled spring.

3. The brake shoe according to claim 1, wherein said yielding member comprises a contained fluid.

4. The brake shoe according to claim 1, wherein said yielding member is secured solely to said web plate.

5. The brake shoe according to claim 4, wherein said yielding member includes at least one coiled spring having opposite ends each secured to said web plate.

6. The brake shoe according to claim 5, wherein said coiled spring is compressed.

7. The brake shoe according to claim 5, wherein said coiled spring is under tension.

8. A brake shoe comprising:

an arcuate member having an inner and outer surface;

a lining secured to said outer surface of said arcuate member and being provided to engage a brake drum in a braking event;

at least one web plate secured to said inner surface of said arcuate member; and a yielding member secured to said web plate, said yielding member being provided to dampen stick slip frequencies of said brake shoe during said brake event thereby reducing objectionable noise, wherein said at least one web plate comprises a pair of spaced apart parallel arranged web plates secured to said arcuate member, said yielding member comprising a coiled spring disposed between said pair of web plates and connected thereto.

9. The brake shoe according to claim 8 wherein said yielding member comprises a pair of side by side arranged coiled springs disposed between said web plates.

10. The brake shoe according to claim 9, wherein each of said pair of coiled springs is provided with a cylindrical sleeve disposed thereabout, said cylindrical sleeves being disposed between and press-fit between said web plates.

11. The brake shoe according to claim 8, wherein at least one of said web plates includes a pair of tabs secured thereto and disposed between said web plates, said coiled spring being attached to said tabs.

12. The brake shoe according to claim 11, wherein said tabs form a chamber between said web plates, said coiled spring being disposed within said chamber and compressed to engage said tabs and retained thereto.

13. The brake shoe according to claim 11, wherein said pair of web plates each have a pair of opposite bores and a pair of pins one each disposed in each of said pair of said opposite bores to form a bridge between said spaced apart web plates, said coiled spring being attached to said pins under tension.

14. The brake shoe according to claim 13, wherein said coiled spring comprises a pair of side by side arranged coiled springs disposed between said web plates.

15. The brake shoe according to claim 14, wherein each of said pair of coiled springs is provided with a cylindrical sleeve disposed thereabout, said cylindrical sleeves being disposed between and press-fit between said web plates.

16. A brake shoe comprising:

an arcuate member having an inner and outer surface;

a lining secured to said outer surface of said arcuate member and being provided to engage a brake drum in a braking event;

at least one web plate secured to said inner surface of said arcuate member; and a yielding member comprising a pair of side by side arranged coiled springs secured to said web plate, said yielding member being provided to dampen stick slip frequencies of said brake shoe during said brake event thereby reducing objectionable noise.

* * * * *